Figure 1:
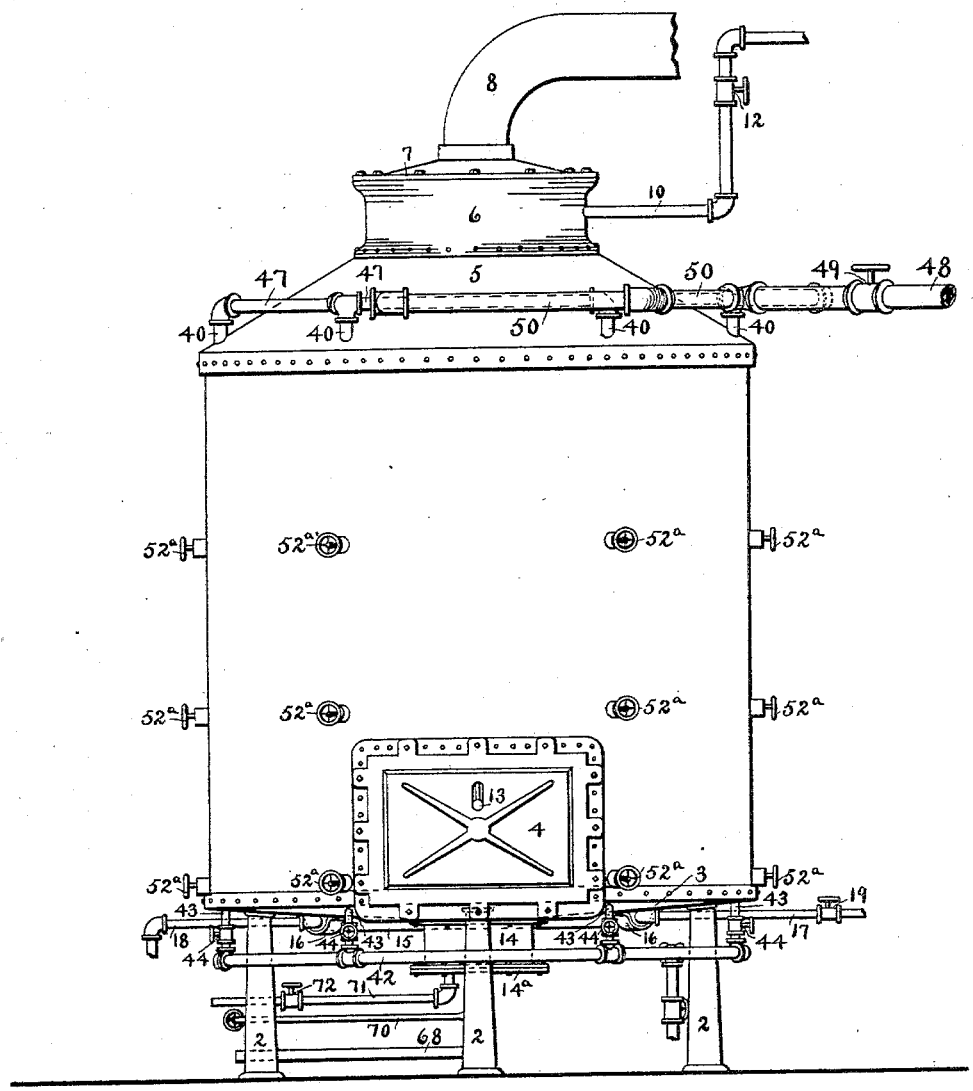

(No Model.)  5 Sheets—Sheet 1.

G. F. METZGER.
PERCOLATOR FOR EXTRACTING OIL.

No. 566,599.  Patented Aug. 25, 1896.

WITNESSES:
H. P. Bailey.
S. A. Cook.

INVENTOR:
G. F. Metzger,
by Burridge & Cutter,
Attys.

(No Model.) 5 Sheets—Sheet 2.

G. F. METZGER.
PERCOLATOR FOR EXTRACTING OIL.

No. 566,599. Patented Aug. 25, 1896.

WITNESSES:
H. C. Bailey
S. A. Cook

INVENTOR:
G. F. Metzger,
by Burridge + Cutter,
attys.

(No Model.) 5 Sheets—Sheet 3.

G. F. METZGER.
PERCOLATOR FOR EXTRACTING OIL.

No. 566,599. Patented Aug. 25, 1896.

WITNESSES:
H. P. Bailey
S. A. Cook

INVENTOR:
G. F. Metzger,
by Burridge & Cutter,
attys.

(No Model.) 5 Sheets—Sheet 4.

G. F. METZGER.
PERCOLATOR FOR EXTRACTING OIL.

No. 566,599. Patented Aug. 25, 1896.

WITNESSES:
H. P. Bailey
S. A. Cook

INVENTOR:
G. F. Metzger,
by Burridge & Cutter,
Attys.

(No Model.) 5 Sheets—Sheet 5.

G. F. METZGER.
PERCOLATOR FOR EXTRACTING OIL.

No. 566,599. Patented Aug. 25, 1896.

WITNESSES:
H. P. Bailey
S. A. Cook

INVENTOR:
G. F. Metzger,
by Burridge & Cutter,
attys.

UNITED STATES PATENT OFFICE.

GOTTLEIB F. METZGER, OF CLEVELAND, OHIO.

PERCOLATOR FOR EXTRACTING OIL.

SPECIFICATION forming part of Letters Patent No. 566,599, dated August 25, 1896.

Application filed October 10, 1895. Serial No. 565,302. (No model.)

*To all whom it may concern:*

Be it known that I, GOTTLEIB F. METZGER, a citizen of the United States, residing at Cleveland, in the county of Cuyahoga and State of Ohio, have invented certain new and useful Improvements in Percolators for Extracting Oil, of which the following is a full, clear, and exact description.

My invention relates to that class of percolators employed in the so-called "naphtha process" of extracting oil from seed; and it consists of the parts hereinafter fully described and especially claimed.

The object of my improvement is to provide a percolator for extracting oil from cotton-seed meal, linseed meal, and other oleaginous meals which excels in cheapness of construction, simplicity and ease of operation, and general utility.

The use of vertical stand-pipes about the interior of the tank with the peculiar construction and arrangement of stands, steam-distributing pipes and connections, and guard-arms enable me both to steam out the meal very rapidly and to easily remove the same thereafter, said vertical pipes affording no lodgment for said meal, while said stands, distributing-pipes, connections, &c., are readily thrown down. The facility with which the movable parts in the tank are displaced, cleansed, and replaced renders them most convenient and serviceable. The stationary pipes and members in and about the tank are also arranged to be taken apart when necessary with little trouble. These and other advantages not above enumerated are the direct results of my invention and distinguish it from other apparatus of this class.

That my invention may be seen and fully understood by those skilled in the art, reference will be had to the following specification and annexed drawings, forming a part thereof, in which—

Figure 2:
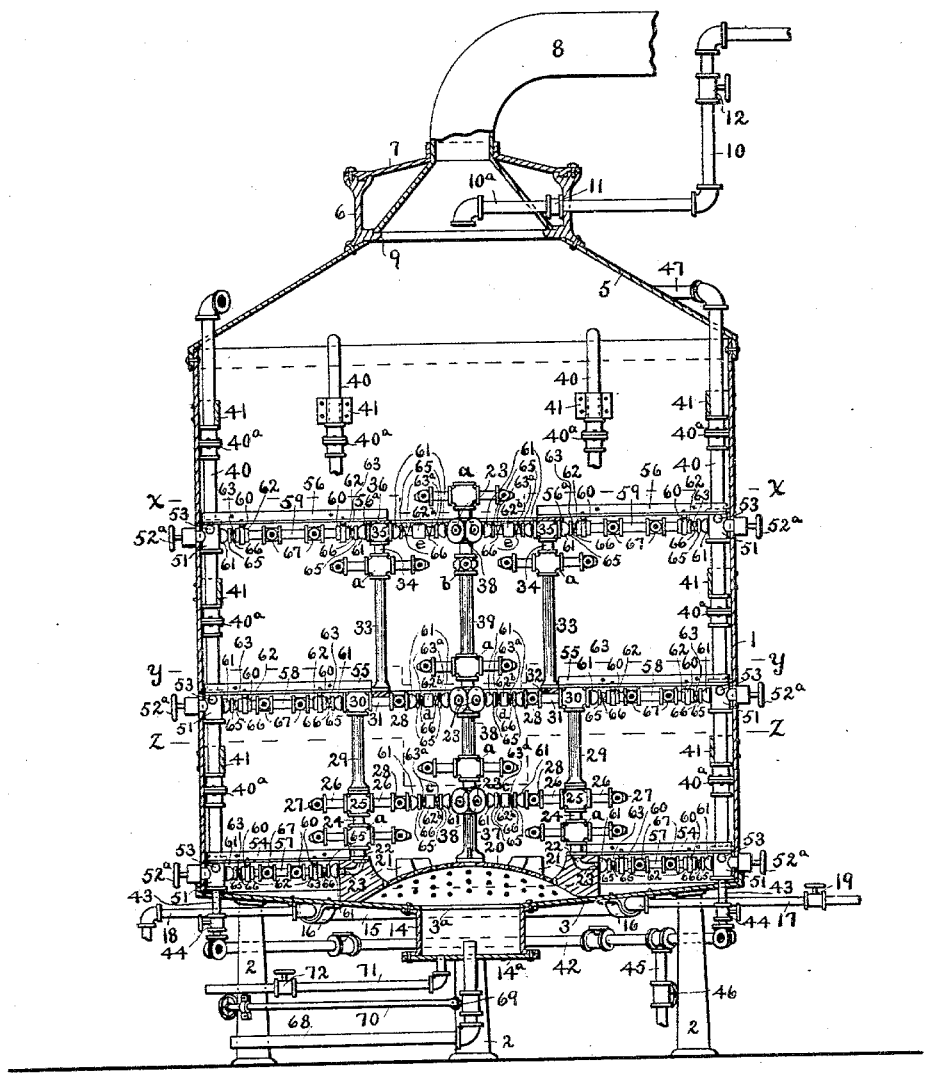
Figure 3:
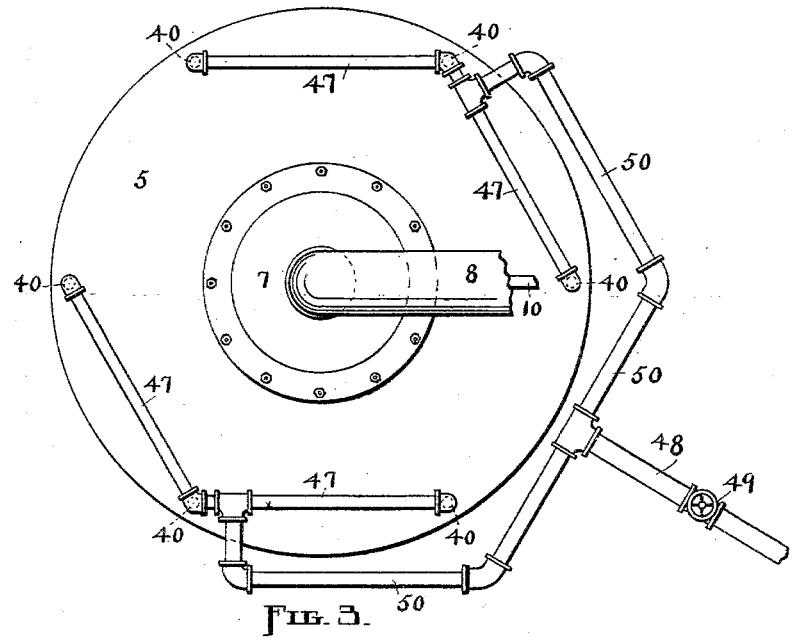
Figure 4:
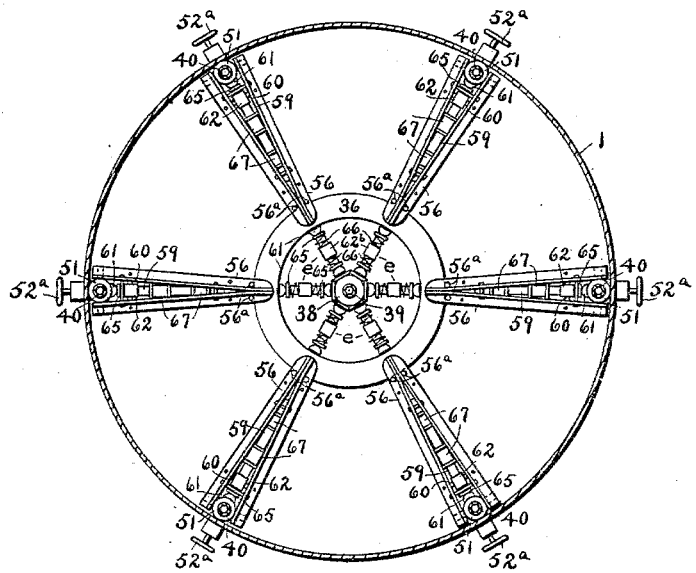
Figure 5:
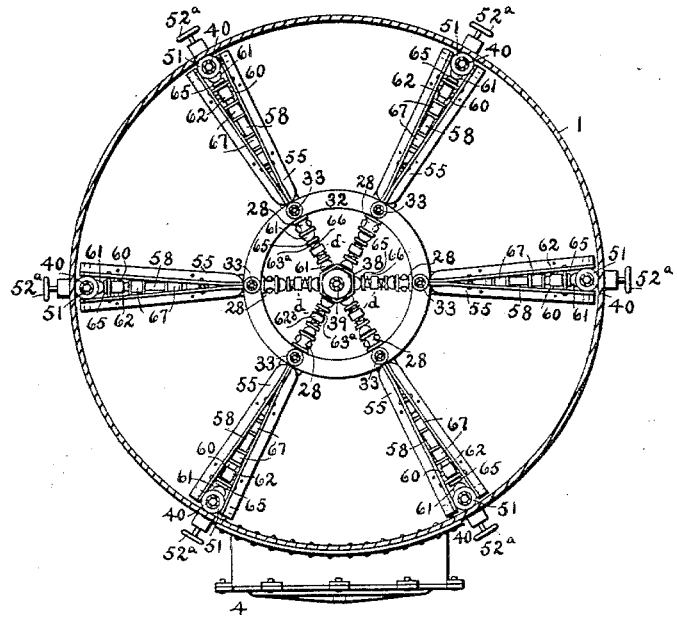
Figure 6:
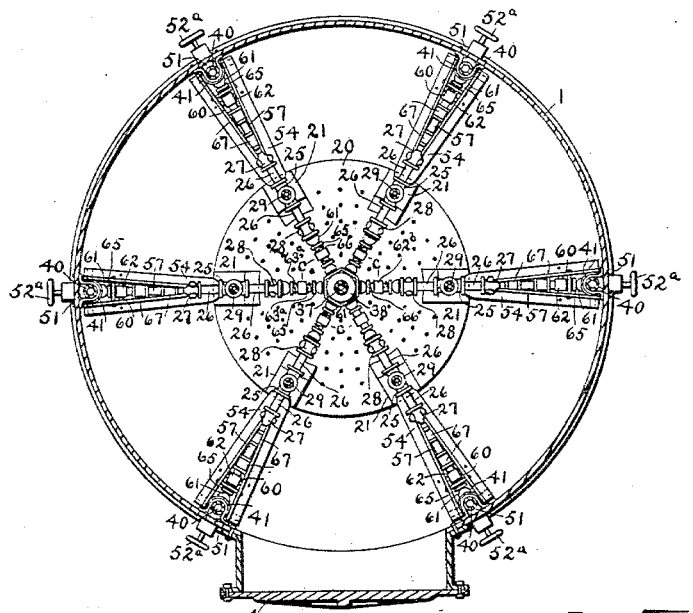
Figure 2:
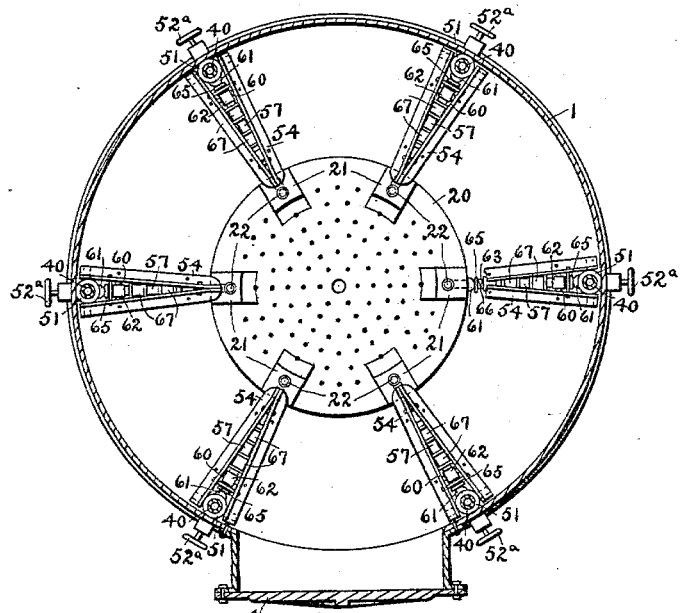
Figure 8:
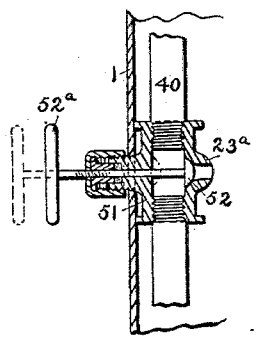
Figure 9:
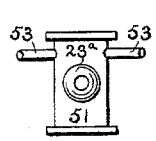
Figures 10, 11:
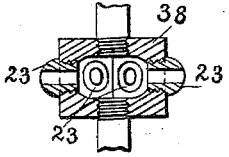
Figure 12:
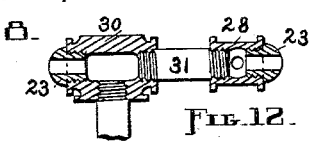
Figure 13:
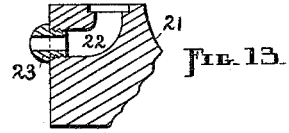
Figure 15:
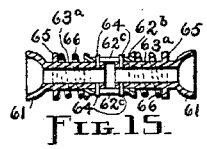
Figure 14:
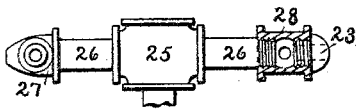
Figure 16:
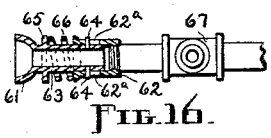

Figure 1 is a front elevation of my percolator; Fig. 2, a vertical central section of the same, showing the several movable parts in operative position; Fig. 3, a plan view of the top of said percolator; Fig. 4, a cross-section on lines $x\,x$, Fig. 2; Fig. 5, a cross-section on lines $y\,y$, Fig. 2; Fig. 6, a cross-section on lines $z\,z$, Fig. 2; Fig. 7, a cross-section above the strainer and lowest series of guard-arms, (the inner end of one pair of guard-arms being broken off to show the connections below,) all other temporary members being removed; Fig. 8, an enlarged vertical central section of one of the stand-pipe-valve connections, the valve being shown open by dotted lines and closed by full lines; Fig. 9, a front view of the same; Fig. 10, an enlarged sectional view of one of the upper stand-heads; Fig. 11, an enlarged sectional view of one of the six-way couplings; Fig. 12, an enlarged sectional view of one of the middle stand-heads and connections; Fig. 13, an enlarged sectional view of one of the strainer-pedestals; Fig. 14, an enlarged sectional view of one of the lower stand-heads and connections; Fig. 15 an enlarged sectional view of one of the central steam-distributing connections; and Fig. 16, an enlarged sectional view of one of the outer steam-distributing pipes, one-half of the same only being shown.

Similar letters and figures designate like parts in the drawings and specification.

The tank 1 is raised the desired distance from the floor by the posts 2, and is made of a size suitable for the work it is required to do, hence may be larger or smaller according to the demand. The tank 1 has the slightly concave floor 3 converging toward the center, and is provided with the door 4 on the front at the bottom. The top 5, substantially convex, surmounts the tank 1, and the dome 6 is superimposed on said top and provided with the cover 7. The exit-pipe 8, having a funnel-shaped mouth to facilitate the escape of vapor through said pipe, extends upward from the supporting-flange 9 at the base of the dome 6, through the cover 7, to a "condenser." (Not shown or described, since it is a separate apparatus.) It will be understood that the joint between the top of the dome 6 and the cover 7 is rendered air-tight by a gasket or other suitable means, as are all other joints in and about the percolator. The naphtha-inlet pipe 10 extends from a reservoir (not shown) through the dome 6 and opens over the interior of the tank 1. The section $10^a$ is attached to the pipe 10 by the coupling 11 inside of the dome 6, in order to allow said section to be detached from said pipe when it is desired to remove the pipe 8 and the cover 7 from said dome, since said section passes through the funnel-shaped end of said pipe 8. The pipe 10 is provided with the valve 12. The thermometer 13 in the door 4 registers the inside temperature of the tank 1.

The central opening 3ª appears in the floor 3, and the receiving-pot 14 is bolted to said floor directly beneath said opening. The pot 14 is open at the top and closed at the bottom by the plate 14ª. The semicircular exhaust-steam-heating pipe 15, attached to the under side of the floor 3 by the straps 16, is covered with a suitable non-heat-conducting material. The inlet-pipe 17 conveys exhaust-steam into one end of the pipe 15, while the outlet-pipe 18 carries the steam away. The former pipe has the valve 19. The strainer 20 covers the floor opening 3ª and is removable.

The strainer 20 has the pedestals 21 preferably cast thereon, and each of said pedestals is supplied with the curved passage 22, opening at the top and outside thereof. A semispherical perforated nipple-bearing 23 is screwed into the outer end of each passage 22, as shown in Fig. 13. The pedestals 21, six in number, support the perforated stands 24, which terminate in the heads 25. Each head 25 has the short pipes 26 26 leading from opposite ends thereof, with the perforated cross 27 at the terminal of the outer pipe and the cross 28 at the terminal of the inner pipe, (see Fig. 14,) the latter cross being provided with the nipple-bearing 23, like those attached to the strainer-pedestals 21.

The non-perforated stands 29 are carried by the heads 25 and terminate in the heads 30. (Best shown in Fig. 12.) The outer ends of the heads 30 are provided with the nipple-bearings 23, while the short pipes 31, having the perforated crosses 28 thereon, extend from the inner ends of said heads, said crosses possessing the nipple-bearings 23 before described. The ring 32 rests upon the short pipes 31 and supports the non-perforated stands 33, which terminate in the perforated sections 34. The sections 34 have the heads 35, provided with the nipple-bearings 23, as illustrated in Fig. 10, two being used for each head. The heads 35 carry the ring 36. The several stands above described correspond in number with the strainer-pedestals 21.

The stand 37 rests upon the center of the strainer 20 and is non-perforated at both top and bottom. The stand 37 is furnished with the six-way coupling 38, located some little distance above the strainer 20. The coupling 38 is provided with six nipple-bearings 23, the centers of which are on a line with the centers of the heads 25. The stand 37 supports the stand 39, which is non-perforated in its central part and has a six-way coupling 38 at the base and another similar coupling 38 at the top, the center of the former coupling being on a line with the centers of the heads 30, and the center of the latter coupling being on a line with the centers of the heads 35.

The several stands are furnished with the additional steam-outlets $a$ and $b$, (shown in Fig. 2,) which may vary in number and location.

The six vertical stand-pipes 40 are arranged about the interior of the tank 1 equidistant from each other and fastened to the wall of said tank by the straps 41. The pipes 40 open into the horizontal annular waste-pipe 42 below the floor 3 by way of the small pipes 43, which pass through said floor. Each of the pipes 43 is provided with a valve 44. The annular pipe 42 has an outlet through the vertical pipe 45, which has the valve 46. The stand-pipes 40 are divided into two series of three pipes each above the top 5 by the pipes 47. The main steam-pipe 48, having the valve 49, connects with the pipes 47 through the pipes 50, the latter opening into said pipes 47 near the central pipes 40 of the two series. The couplings 40ª connect adjacent sections of each pipe 40 and permit of the taking apart of said pipes when necessary.

Each pipe 40 is furnished with three valve connections 51, having on their interior faces the semispherical perforated nipple-bearings 23ª, similar in size and shape to the bearings 23. The valve 52, situated in each valve connection 51 and operated by the wheel 52ª and a stem packed in the usual manner, is arranged to close or open the perforation in the bearing 23ª without materially obstructing at any time the passage through the pipe 40, as will be readily seen by referring to Fig. 8. Each valve connection 51 has the lateral projections 53 53, and the center of its bearing 23ª is directly in line with the center of the corresponding bearing 23 on the heads 30 or 35 or the pedestal 21, as the case may be.

A greater or less number of stand-pipes, stands, and connecting parts than are here shown may be employed, provided their same general arrangement is maintained.

The guard-arms 54, 55, and 56 for protecting the jointed steam-distributing pipes 57, 58, and 59, while temporarily connected, are supported at one end on the projections 53 of the valve connections 51 and at the other end on the strainer-pedestals 21, the heads 30, and the ring 36 above the heads 35, respectively. The arms 54, 55, and 56 are each preferably made of two pieces of angle-iron, bolted together at their inner ends and spaced at their outer ends, being constructed to temporarily rest in the positions above designated. Said arms serve further to prevent the meal from packing or settling down in a solid mass to the bottom of the tank 1, and thereby promote the extraction of the oil. The arms 56 have the downwardly-extending pins 56ª to bear against the periphery of the ring 36 and center the same.

The jointed distributing-pipes 57, 58, and 59 are permanently secured to the arms 54, 55, and 56, respectively, by the iron straps 60, or in any other suitable manner. Said pipes 57, 58, and 59 are equipped at both ends with the sockets 61, to match the nipple-bearings 23 and 23ª, thereby making tight-fitting joints therewith, but in no way retarding the dropping away or removal of said pipes with their supporting-arms at the proper time. At each end of each of the pipes 57, 58, and 59 is secured the sleeve 62, having the slots 62ª 62ª therein, and the member 63, having the pins 64 64, which enter said slots, is capable of being reciprocated in said sleeve. On the outer end of the member 63 is the socket 61, with the flange 65 back of the same. The spring 66 is interposed between the flange 65 and the end of the sleeve 62. The pins 64 limit the movement of the member 63, and more or less than two may be used. It will now be seen that the object of the springs 66 and the accompanying sliding construction is to always press the sockets 61 closely against the bearings 23 and 23ª, in order that a free passage may be had through all of the contiguous parts and to allow of the ready removal of the jointed pipes. The pipes 57, 58, and 59 are provided with two perforated crosses 67 (more or less) for spraying live steam into the meal. The guard-arms 54 may be dispensed with, if desired, and the pipes 57 supported from the floor 3.

In order to supply live steam to the outlets $a$ and $b$ and also to complete the radii formed in part by the pipes 58 and 59, the connections $c$, $d$, and $e$ are provided. The three series of connections $c$, $d$, and $e$ are substantially alike, and each connection consists of two members 63ª, operating in the sleeve 62ᵇ, which has the slots 62ᶜ 62ᶜ therein. Each member 63ª has the pins 64 64 projecting into the slots 62ᶜ, the flange 65, and the socket 61. Springs 66 are interposed between the flanges 65 and the ends of the sleeve 62ᵇ. The operation of the connections $c$, $d$, and $e$ is similar to that of the pipes 57, 58, and 59. The resiliency of the springs 66 alone holds the connections $c$, $d$, and $e$ in position. The connections $c$ extend between the crosses 28 from the heads 25 and the lowest six-way coupling 38, the connections $d$ between the crosses from the heads 30 and the middle six-way coupling, and the connections $e$ between the heads 35 and the highest six-way coupling. The rings 32 and 36 serve to center and strengthen the surrounding parts.

The waste-pipes 43, 42, and 45 are utilized for blowing out any condensation which forms or gets into the stand-pipes 40 at the beginning of the "steaming-out" process, or at any other time, thus preventing said condensation from entering the tank 1 and insuring the admission of live steam only into said stand-pipes.

The oil-pipe 68 penetrates the interior of the center of the pot 14, and has the valve 69 operated by means of the rod 70. The test-pipe 71, having the valve 72, is in open connection at one end with the interior of the pot 14, and through said pipe oil is drawn to ascertain its quality and whether there is any moisture in the percolator, which would materially interfere with the regular process unless removed. The precise arrangement of the pipes beneath the tank 1 is not arbitrary, provided the same general disposition is made of the same.

The oil obtained by the two steps of the process hereinafter described, with a certain amount of naphtha, percolates through the meal to the concave floor 3 and necessarily runs toward the center, where it passes into the receiving-pot 14 through the strainer 20. The mixture of oil and naphtha is drawn from the pot 14 as it accumulates therein through the pipe 68, the valve 69 being opened for that purpose, until substantially all of the oil has been extracted from the meal.

It is assumed for the purpose of this description that all valves are closed unless otherwise specified.

The operation of my percolator is set forth in the following description: First make sure that the interior of the tank 1 is perfectly free from moisture and fill the same with meal. Now saturate the meal with raw naphtha or other volatile solvent, which enters the tank 1 through the pipe 10 and section 10ª. The meal being thus saturated, turn on exhaust-steam at the bottom of the tank 1 into the pipe 15, and thereby warm or heat the contents of said tank. This heated state continues for a period of forty-eight hours, (more or less,) or until all of the oil has been extracted from the meal. Of course live steam may be used instead of exhaust for heating the tank 1, but the latter is more economical. From time to time draw off charges of the oil and naphtha mixture from the pot 14. As the liquid is removed from the tank 1 fresh quantities of raw naphtha are supplied to said tank until only a very small per cent. of oil remains in the meal. After all of the naphtha with the oil has been drained off that can be, a small percentage still remains in the meal, probably not exceeding two per cent., and this must be expelled to render said meal of value for commercial purposes. To expel this remaining naphtha live steam is forced into and through all parts of the meal, a step in the process called "steaming out." The valve 49 in the main steam-pipe 48 is opened and live steam admitted into and through the stand-pipes 40 via the pipes 50 and 47, all condensation having been previously removed from said stand-pipes, as before described. The valves 52 in the upper valve-connections 51 are now opened and steam from the stand-pipes 40 passes through the distributing-pipes 59, the connections $e$, and the upper outlets $a$ and $b$ into the surrounding meal. The upper series of valves 52 are now closed and the middle series opened to admit steam into the meal through the pipes 58, the connections $d$, and the central outlet $a$. Lastly, close the middle valves 52 and open the valves in the lower valve connections 51, when the steam will be forced into the meal through the pipes 57, the connections c, and the lower outlets a. The vapor arising from the meal passes off through the pipe 8 at the top of the tank 1. The arrangement of distributing-pipes herein described affords a very rapid means of driving out all traces of naphtha from the meal in the most thorough manner.

It is well known that the shorter distance and the fewer turns necessary for steam to travel and encounter the less likely it is to condense. Hence I make a great saving by placing all of my induction-pipes inside of the tank, excepting, of course, the main supply-pipe and connecting-pipes above the top of said tank. The entire amount of heat radiating from the stand-pipes, located as they are inside of the tank in the meal, is utilized and tends to render my apparatus extremely economical and expeditious.

When the steaming-out process has been completed, which ordinarily does not require more than three or four hours, there remains nothing more to do except remove the meal from the tank 1. To do this, take away the door 4 and the dome-cover 7, with the exit-pipe 8, to permit of the escape of the hot vapor through the top. With a shovel remove the meal from the tank 1 until one of the stands 24 which is nearest the door-opening is reached, when said stand is withdrawn and the entire superstructure, including stands with their permanent and temporary connections and the guard-arms with attached pipes, will be precipitated to the floor 3 as more and more of the meal is shoveled out. These parts and the lower guard-arms and attached pipes are removed from the tank 1 as they are reached. The perpendicular stand-pipes 40 offer no obstruction to the falling meal, as would be the case were said pipes horizontal. The tank 1 is now thoroughly cleansed on the inside, and the removed parts are also cleansed before being replaced in operative position for the refilling of said tank with meal prior to the repetition of the process hereinbefore described.

Obviously many of the parts herein described and shown in the drawings may be more or less modified or varied in construction and arrangement without departing from the spirit of the invention, and I do not therefore consider myself bound to the exact form, shape, and style of the several parts as shown.

My construction avoids all liability of getting condensed steam into the meal, which is a valuable feature, since condensation retards the steaming-out process very considerably.

The seed or meal is perfectly dry when put into the percolator, because the presence of moisture interferes with the action of the naphtha on the same, and it is practically impossible to extract oil from moist meal with naphtha.

What I claim as my invention, and desire to secure by Letters Patent, is—

1. The combination in a percolator, of a tank, a series of vertical stand-pipes about the inside of said tank, valve connections having semispherical perforated nipple-bearings arranged at different elevations on said stand-pipes, and valves situated in said connections adapted to open or close the perforations in said bearings without obstructing the stand-pipe passages, substantially as and for the purpose set forth.

2. The combination in a percolator, of a tank, vertical stand-pipes fixed about the inside of said tank, valve connections on said stand-pipes having nipple-bearings, a strainer on the floor of said tank provided with perforated pedestals having nipple-bearings, and distributing-pipes temporarily socketed to said valve connections and pedestal-bearings, substantially as and for the purpose set forth.

3. The combination in a percolator, of a tank, vertical stand-pipes fixed about the inside of said tank, valve connections on said stand-pipes having nipple-bearings and lateral projections, a strainer on the floor of said tank provided with perforated pedestals having nipple-bearings, distributing-pipes temporarily socketed to said valve connections and pedestal-bearings, and disconnecting guard-arms supporting said distributing-pipes on said projections and pedestals, substantially as and for the purpose set forth.

4. The combination in a percolator, of a tank having a strainer on the floor thereof, said strainer provided with perforated pedestals having nipple-bearings, perforated knockdown stands supported by said pedestals over the pedestal perforations, outlets and crosses with nipple-bearings attached to said stands, a central knockdown stand perforated in the middle part resting on said strainer having outlets and a coupling with nipple-bearings, vertical stand-pipes about the interior of said tank having valve connections and nipple-bearings, and temporarily socketed radial distributing-pipes and connections between said bearings, substantially as and for the purpose set forth.

5. The combination in a percolator, of a tank, central knockdown stands carried by a strainer and having outlets, heads and a coupling, the two latter provided with nipple-bearings, crosses with nipple-bearings projected from said heads, temporarily socketed radial connections between said coupling and said crosses, vertical stand-pipes about the interior of said tank having valve connections with nipple-bearings, lateral projections on said valve connections, radial distributing-pipes temporarily socketed between said heads and valve connections, and disconnecting guard-arms supporting said distributing-pipes on said projections and heads, substantially as and for the purpose set forth.

6. The combination in a percolator, of a tank, a ring supported by knockdown stands and in turn supporting other knockdown stands having heads with nipple-bearings and outlets, a central knockdown stand provided with outlets and a coupling with nipple-bearings, temporarily socketed radial connections between said heads and coupling, vertical stand-pipes about the interior of said tank having valve connections with nipple-bearings, lateral projections on said valve connections, radial distributing-pipes temporarily socketed between said heads and valve connections, and disconnecting guard-arms supporting said distributing-pipes on said projections and heads, substantially as and for the purpose set forth.

7. The combination in a percolator, of a tank, vertical stand-pipes about the interior of said tank, valve connections at different elevations on said stand-pipes having nipple-bearings, central perforated and non-perforated knockdown stands carrying members with nipple-bearings at the several heights of said valve-connection bearings, and radial distributing-pipes and connections temporarily socketed to said bearings, the parts being arranged to discharge steam at certain given elevations, substantially as and for the purpose set forth.

8. The combination in a percolator, of a tank, vertical stand-pipes about the interior of said tank, valve connections at different elevations on said stand-pipes having nipple-bearings, central perforated and non-perforated knockdown stands carrying members with nipple-bearings at the several heights of said valve-connection bearings, radial distributing-pipes and connections temporarily socketed to said bearings, disconnecting guard-arms carrying said distributing-pipes, and means for supporting said arms, substantially as and for the purpose set forth.

9. The combination in a percolator, of a series of interior vertical stand-pipes fixed to the wall of a tank, provided with nipple-bearings, nipple-bearings on corresponding parts, and steam-distributing pipes provided at both ends with spring-actuated members, temporarily socketed to said bearings, substantially as and for the purpose set forth.

10. The combination in a percolator, of a series of interior stand-pipes fixed to the wall of a tank provided with nipple-bearings, nipple-bearings on corresponding parts, steam-distributing pipes provided at both ends with spring-actuated members, temporarily socketed to said bearings, disconnecting guard-arms carrying said distributing-pipes, and means for supporting the same, substantially as and for the purpose set forth.

11. The combination in a percolator, of a series of knockdown stands provided with parts having nipple-bearings, surrounding central knockdown stands provided with parts having nipple-bearings, and connections each consisting of two spring-actuated members operating in a sleeve, said connections temporarily socketed to said bearings, substantially as and for the purpose set forth.

12. In a percolator, a tank having a perforated floor, a conical top surmounted by a dome, a cover on said dome, a central removable vapor-exit pipe having a flaring mouth extending through said cover, and a naphtha-inlet pipe provided with a detachable section extending through said dome, in combination with a series of vertical stand-pipes attached to the inside of said tank, a strainer over the perforation in said floor having perforated pedestals, supporting perforated and non-perforated knockdown stands, radial distributing-pipes and connections temporarily extending between the several vertical parts, and disconnecting guard-arms supporting said distributing-pipes, substantially as and for the purpose set forth.

13. In a percolator, a tank having a door and a concave floor open at the center, a strainer over the opening provided with perforated pedestals, perforated and non-perforated stands carried by said strainer and pedestals, in combination with a series of vertical stand-pipes within said tank and attached to the wall thereof, said pipes being connected with the main steam-pipe at the top and a waste-pipe at the bottom, valve connections at different elevations on said stand-pipes, guard-arms supported by said valve connections at one end and by said pedestals and stands at the opposite end, and steam-distributing pipes carried by said arms; said stands, distributing-pipes and arms arranged to be precipitated to the floor by removing one of the lower stands, substantially as and for the purpose set forth.

In testimony whereof I affix my signature in presence of two witnesses.

GOTTLEIB F. METZGER.

Witnesses:
   C. P. RUPLE,
   F. A. CUTTER.